United States Patent [19]

Morgan

[11] Patent Number: 4,610,168

[45] Date of Patent: Sep. 9, 1986

[54] VARIABLE MAGNETIC FIELD COUPLING CIRCUIT AND ROTARY TRANSDUCER USING SAME

[75] Inventor: Paul W. Morgan, Waterford Township, Oakland County, Mich.

[73] Assignee: Eaton Corporation, Cleveland, Ohio

[21] Appl. No.: 745,173

[22] Filed: Jun. 17, 1985

Related U.S. Application Data

[63] Continuation-in-part of Ser. No. 722,021, Apr. 11, 1985, abandoned.

[51] Int. Cl.[4] ........................ H01F 23/00; G01L 3/10

[52] U.S. Cl. .................................. 73/862.35; 73/773; 336/120

[58] Field of Search ................ 73/773, 862.33, 862.35; 336/120, 123; 374/154

[56] References Cited

U.S. PATENT DOCUMENTS 3,519,969 7/1970 Hoffman ...................... 73/862.35 X
3,717,029 2/1973 Tveter .......................... 73/862.33 X

FOREIGN PATENT DOCUMENTS 2129138 5/1984 United Kingdom ................. 73/773

*Primary Examiner*—Charles A. Ruehl
*Attorney, Agent, or Firm*—C. H. Grace; A. E. Chrow

[57] ABSTRACT

An improved rotary transducer (60) featuring a rotary member (2) rotatably mounted in a housing (4). Member (2) is preferably provided with a section (8) adapted to enhance measurement of stresses or other parameters of interest imposed upon member (2) under operating conditions preferably by means of one or more strain gages (32) forming one or more legs of a wheatstone bridge preferably mounted on member (2). Excitation voltage for the wheatstone bridge and/or the output voltage therefrom is delivered across an electromagnetic field between a magnetic stator member (16) fixed to housing (4) and a rotor member (18) secured to member (2). Stator member (16) comprises two magnetic stator members (34, 34') having respective asymmetrical facing surface portions adapted such that selective rotation of one relative to the other changes the configuration of an air gap therebetween within which rotor member 18 rotates and thereby changes the electrical reluctance of the magnetic coupling field between rotor member 18 and stator members (34, 34') to provide control over the magnetic coupling field and the excitation voltage or signal being transferred thereacross.

7 Claims, 4 Drawing Figures

VARIABLE MAGNETIC FIELD COUPLING CIRCUIT AND ROTARY TRANSDUCER USING SAME

This is a continuation-in-part of U.S. patent application Ser. No. 722,021, filed Apr. 11, 1985, now abandoned.

INTRODUCTION

This invention relates generally to a magnetic field coupling circuit between relatively fixed and rotary members and more particularly to a magnetic field coupling circuit that is able to be controlled by variation in reluctance or magnetic resistance of the coupling circuit and the adaptation thereof to a rotary transducer adapted to sense stresses or other parameters of interest imposed on the rotary member by means of at least one sensor member such as a strain gage secured thereto.

BACKGROUND OF THE INVENTION

Magnetic field coupling circuits between windings of a rotor secured to a rotary member and windings of a fixed stator adjacent thereto have been known and utilized for many years for example in electrical motors, generators, rotary transformers and rotary transducers.

Examples of variations in the means by which magnetic coupling fields are produced in rotary transformers are respectively disclosed in U.S. Pat. Nos. 2,432,982; 3,317,873; 3,348,181; 3,519,969 and 3,531,749, the disclosures of which are incorporated herein by reference.

The rotary magnetic field coupling circuit has heretofore commonly been provided by rotating the rotor and its windings in the vicinity of electrified windings of a fixed stator made from magnetic material to provide an electro-magnetic field coupling circuit therebetween capable of enabling an electrical signal to be transmitted from one to the other without actual contact between the rotor and the stator.

However, the problem with such prior art rotor-stator magnetic field coupling circuits is that they have heretofore been limited to conventional rotors and stators providing an electro-magnetic field having an intensity which once established has been unable to be varied excepting perhaps by varying the electrification of the winding coils.

Such rotor-stator arrangements have heretofore been used in rotary transducers of the type in which a sensor such as a RTD, or piezo electric, or piezo resistive, or acoustic emission transducer, or strain gage is secured to the rotatable member as part of a sensing circuit to which an electrical excitation voltage or signal may be delivered and from which an electrical output voltage or signal must be delivered in order to measure parameters of interest such as stresses imposed upon the rotary member as is well known to those skilled in the art. Heretofore, however, the excitation signal and output signal had to pass across the magnetic field provided by conventional rotor-stator arrangements without the ability to selectively vary the nature of the coupling magnetic field once installed so as to control the level of the excitation signal and/or the output signal therefrom in the manner desired.

In view of the above, a need exists to provide an effective method of varying the nature such as intensity of a magnetic field coupling circuit between relatively fixed and rotary members with particular applicability to providing control over an excitation signal provided to and/or an output signal derived from of at least one sensor member secured to the rotary member such as the output signal of at least one strain gage secured to the rotary member in instances where a wheatstone bridge coupled thereto is mounted on other than the rotary member or the excitation voltage to and the output signal derived from a wheatstone bridge-strain gage circuit secured to the rotary member.

SUMMARY OF THE INVENTION

Accordingly, it is an object of the present invention to provide a magnetic field coupling circuit between relatively fixed and rotary members that is able to be effectively controlled.

It is another object of this invention to provide an improved rotary transducer comprising relatively fixed and rotary members wherein at least one sensor member is secured to the rotary member for sensing parameters such as stresses imposed thereupon and wherein means is provided for effectively varying a magnetic field coupling circuit between the fixed and rotary members in the manner desired to control the nature of the magnetic field and consequently control either or both an electrical excitation signal to and an electrical output signal derived from the sensor member.

DESCRIPTION OF SOME PREFERRED EMBODIMENTS

Figure 1:
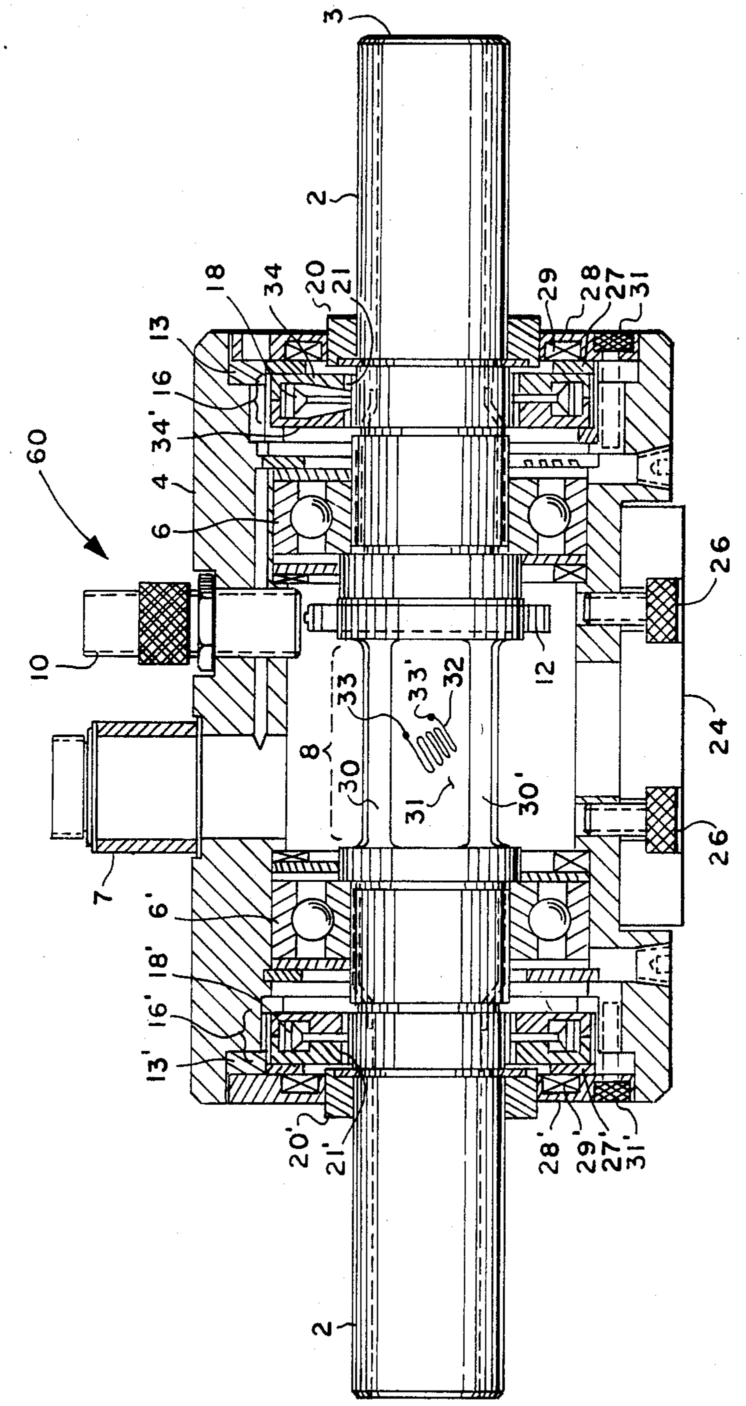
FIG. 1 is a partial cross-sectional view taken along the rotational axis of an embodiment of a rotary transducer utilizing the controllable magnetic field coupling circuit of the invention.

FIG. 1 shows a rotary transducer 60 made in accordance with the invention. Transducer 60 comprises a rotary member 2, preferably in the form of a solid cylindrical shaft, rotatably mounted on a housing 4 by means of spaced-apart bearings 6 and 6'. Although preferably solid, the ends of shaft 2 may be hollow where suitable for the intended use of transducer 60.

Transducer 60 preferably includes a suitable contacting or non-contacting speed sensor 10 secured to housing 4 adapted to measure rotational speed of rotary member 2 well known to those skilled in methods for sensing rotational speed of a rotating member such as by bringing circumferentially spaced protuberances extending radially outwardly from member 12 into proximity with the magnetic field of sensor 10 where sensor 10 is a Hall effect type sensor. Transducer 60 also preferably includes a receptacle 7 for housing electrical circuitry associated with transducer 60.

A section of member 2 referenced as 8 is provided in member 2 between bearings 6 and 6' to enhance sensing parameters such as stresses imposed upon member 2 without materially affecting the intended operating conditions thereof as is well known to those skilled in the art of rotary transducers. Any suitable configuration of member 2 within section 8 may used to sense parameters such as stresses imposed on member 2 for the particular application intended for transducer 60. For example section 8 of rotary member 2 may have a solid cylindrical shape of reduced diameter or comprise two or more spaced-apart posts or columns extending across section 8 between opposite ends of rotary member 2 or provided by thinning the wall of member 2 within section 8 where member 2 is a hollow shaft or, such as the latter, where the hollow configuration within section 8 has a reduced diameter, or where section 8 has a hollow or solid cruciform or square configuration.

Generally, section 8 comprises a section of rotary member 2 that has a cross-sectional configuration adapted to enhance sensing of parameters of interest such as stresses imposed upon member 2 as is well known to those skilled in the art.

For illustrative purposes, section 8 of rotary member 2 of FIG. 1 has a solid generally square cross-sectional configuration provided by dressing flats (such as flat 31) disposed 90 degrees from each other about the central rotational axis of section 8 where section 8 has a reduced diameter and which, after providing the flats, has rounded corners such as referenced as 30 and 30′.

Although rotary transducer 60 may employ one or more sensors and/or related electrical circuitry desired to be secured to rotary member 2 requiring an electrical excitation signal and/or providing an electrical output signal therefrom, the sensor is shown and hereinafter described for illustrative purposes as a resistive strain gage 32 suitably secured to section 8 of rotary member 2.

Strain gage 32 is secured rotary member 2 within section 8 in a suitable manner for example at 45 degrees from the central rotational axis of rotary member 2 (and section 8) for sensing torsional stresses imposed on rotary member 2 under operating conditions. Strain gage 32 generally comprises a thin electrically resistive wire or electrically conductive member secured to or printed upon an electrically insulative member which in turn is secured, commonly by a suitable adhesive, to the member for which stress is to be measured. Generally, a plurality of such strain gages may be used for a particular application which are oriented at varying angles with respect to the central rotational axis of section 8 on one or more sides thereof. Strain gage 32 may, for example, comprise one or more legs of a wheatstone bridge where it is desired to secure the wheatstone bridge to section 8 of rotary member 2 rather than on a stationary member.

Strain gage 32 is provided with electrical leads 33 and 33′ enabling gage 32 to be used as one leg of a wheatstone bridge (not shown) which provides an output voltage corresponding to the particular resistance of strain gage 32 under a particular stressed condition where the wheatstone bridge, as previously described, may itself be secured by suitable means to member 2. In the event one or more strain gages are used, various combinations well known to those skilled in the art can be used to provide one or more of the four legs of one or more wheatstone bridges according to the particular combination of stresses desired to be sensed.

Housing 4 of transducer 60 is preferably provided with a removable cover plate 24 secured to housing 4 by bolts 26 enabling cover plate 24 to be removed so that access is available to section 8 of member 2 as shown in FIG. 1.

Since, as is well known to those skilled in the art of strain gage sensors, an output signal must be provided from one or more strain gages secured to member 2 or an excitation voltage or signal must be delivered to and an output voltage or signal delivered from a wheatstone bridge secured to member 2 for use in determining the stresses being imposed upon member 2, means must be provided for delivering the excitation voltage or signal from stationary housing 4 to rotary member 2 and for delivering the output voltage or signal from rotary member 2 to stationary housing 4.

The means by which the signal is provided by one or more strain gages or the excitation voltage or signal is delivered to the wheatstone bridge secured to rotary member 2 and the output voltage or signal is delivered therefrom is provided by a magnetic field coupling circuit controlled in a manner hereinafter described.

Housing 4 is provided with electrically conductive annular stator members 16 and 16′ at opposite ends thereof. The opposite ends of housing 4 are bored to respectively receive stator members 16 and 16′. Stator members 16 and 16′ are commonly electrically conductive to housing 4 and are provided with central openings therethrough having a diameter greater than the diameter of member 2 at the location at which stator members 16 and 16′ are positioned with respect to member 2 within housing 4. Stator members 16 and 16′ respectively preferably include an outer annular washer member 27 and 27′ suitably bonded thereto and are held in place by means of springs 29 and 29′ which in turn are respectively held in place by respective annular removable covers 28 and 28′ which are respectively held in place by respective bolts (not referenced). (At least one of stator members 16 and 16′ are comprised of split half members 34 and 34′ hereinafter described more fully with respect to FIGS. 3A and 3B.)

Rotors 18 and 18′ are suitably electrically insulated from member 2 and secured for rotation in unison therewith. Balancing collars 20 and 20′ are preferably respectively disposed about member 2 respectively outwardly from stator members 16 and 16′ to provide balanced rotation of member 2. The outer periphery of half-members 34 and 34′ of at least one of stators 16 and 16′ or a member secured thereto may be provided with gear teeth for causing rotation thereof relative to the other by engagement with teeth of a rotatable adjustment tool when screws 31 and 31′ are loosened or by other suitable means such as hereinafter more fully described.

The combination of stator 16 and rotor 18 and of stator 16′ and rotor 18′ provides the respective magnetic field coupling circuits by which the respective excitation voltage or signal is able to be delivered to a wheatstone bridge mounted on member 2 and by which the output voltage or signal is able to be delivered therefrom for use in measuring stresses being imposed upon member 2. For illustrative purposes, stator 16 is the primary stator and rotor 18 is the secondary rotor providing the magnetic field coupling circuit by which the excitation voltage or signal is able to be delivered to a wheatstone bridge mounted on member 2 and rotor 18′ is the primary rotor and stator 16′ is the secondary stator providing a magnetic field coupling circuit by which the output voltage or signal is able to be delivered from the wheatstone bridge mounted on member 2.

As previously described, at least one of the magnetic stator members 16 and 16′ (in this case stator member 16) comprises a pair of magnetic stator half-members 34 and 34′ secured to housing 4 coaxially about rotary member 2. Stator members 34 and 34' have a respective opening 21 therethrough that is larger in diameter than the outer diameter of rotary member 2 to enable member 2 to rotate therewithin without contacting members 34 and 34'. Members 34 and 34' are held in a bore (not referenced) in the right end of housing 4 as viewed in FIG. 1 by means of annular bracket 13. An annular load washer 27 is preferably bonded to the outwardly facing surface of member 34 as previously described and against which is urged annular spring 29 that is compressed by removable end cover 28 to hold members 34 and 34' in a firm, stationary contacting relationship with housing 4.

Stator members 34 and 34' are designed such that, when assembled in housing 4, a portion of one contacts a portion of the other to provide electrical contact therebetween. Preferably, the electrical contact is provided by axially extending annular extremities 36 of members 34 and 36' of member 34' that are held in electrical contacting relationship with each other by means of springs 29 and cover plate 28 previously described.

Stator members 34 and 34' have respective facing surfaces 37 and 37' that are spaced-apart coaxially from each other within annular extremities 36 and 36' or other axially protecting portions as the case may be to provide an air gap therebetween of which an outermost annular air gap 41 is adapted to contain stator windings 35 of stator 16. Rotor member 18 is coaxially secured to and operative to rotate in unison with member 2 within the air gap between members 34 and 34' and is provided with rotor windings 39 at the radial periphery thereof which rotate with rotary member 2 adjacent stator windings 35 within air gap 41. The electrical connection to stator windings 35 and rotor windings 39 are not shown as they are well known to those skilled in the art of rotor-stator design. Electrification of stator windings 35 provides an electro-magnetic field which induces a current into rotor windings 39 as windings 39 of rotor 18 rotate in unison with member 2 within the air gap between magnetic stator members 34 and 34'.

Figure 3A:
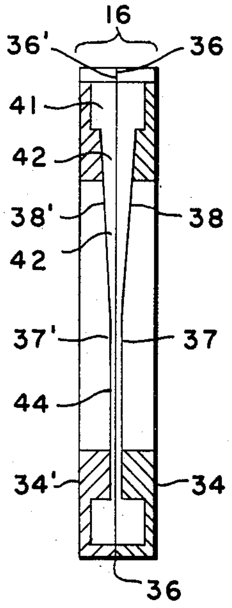
FIGS. 3A and 3B are respective cross-sectional views through the rotational axis of a pair of adjacent stator members of the rotary transducer of FIG. 1 showing two different rotational positions with respect to each other to vary configuration of an air gap therebetween to the provide control over the magnetic field coupling circuit.
Figure 3B:
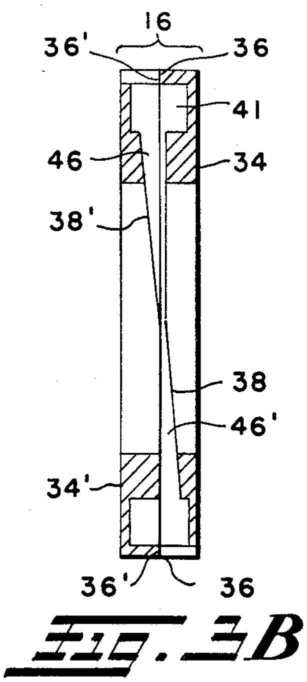

The means by which one is able to control the intensity of the magnetic field coupling circuit between rotor member 18 and stator members 34 and 34' is provided by each of facing surfaces 37 and 37' of members 34 and 34' being respectively asymmetrical as well as at least one of members 34 and 34' being selectively rotatable with respect to the other as shown in FIGS. 3A and 3B. The respective asymmetrical configuration of their facing surfaces within respective extremities 36 and 36' is adapted such that rotation of one of the members 34 and 34' with respect to the other changes the configuration of the air gap therebetween which in turn changes the electrical reluctance of stator member 16 which in turn provides control over, for example, the intensity of the magnetic coupling field passing through the rotor 18 within the air gap between members 34 and 34'.

Rotation of either of the magnetic stator members 34 and 34' is preferably accomplished by first loosening the bolts holding cover plate 28 to frame 4 which in turn reduces the force of spring 29 holding members 34 and 34' firmly in place and then rotating one of members 34 and 34' with respect to the other by suitable means including providing convenient access to either or both stator members 34 and 34' through housing 4 for manual rotation or, if preferred, providing the periphery of at least one of stator members 34 and 34' with teeth engageable with teeth of rotating adjustment screw 31 afterwhich cover plate 28 is then tightened firmly against housing 4 to hold stator members 34 and 34' in stationary relationship with each other and with housing 4.

Figure 2:
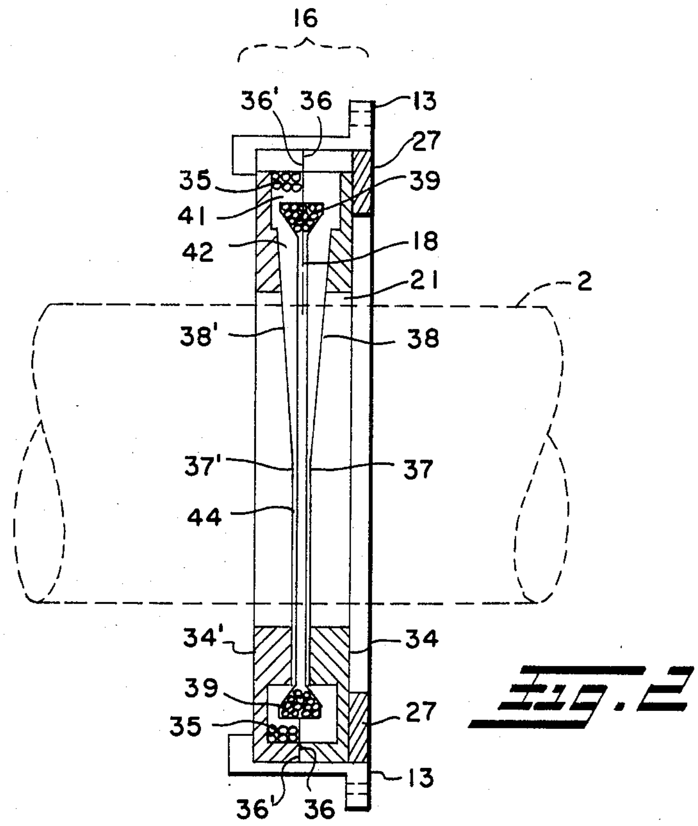
FIG. 2 shows an enlarged cross-sectional view through the stator and rotor members of the rotary transducer of FIG. 1.

FIGS. 3A and 3B show two rotational positions of magnetic stator members 34 and 34' with respect to each other. FIG. 3A shows the rotational position of stator members 34 and 34' shown in FIG. 2. FIG. 3A shows stator member 34 rotated 180 degrees with respect to stator member 34'. The asymmetrical design of facing surfaces 37 and 37' respectively of stator members 34 and 34' is adapted to enable one to change the configuration of the air gap therebetween by rotating one of members 34 and 34' relative to the other which in turn changes and thereby provides control over the reluctance or magnetic resistance of the magnetic coupling field between rotor member 18 and stator members 34 and 34' which in turn provides control over an electrical signal transferred thereacross as previously described.

Although any means of providing spaced apart asymmetrical facing surfaces of stator members 34 and 34' adapted to change the configuration of the air gap therebetween by rotating one with respect to the other a selected angular amount may be employed, the asymmetry is preferably provided by providing tapers 38 and 38' respectively on a portion of surfaces 37 and 37' that taper away from each other radially outwardly from the central rotational axis of stator members 34 and 34' as shown in FIG. 3A. The result of such tapers 38 and 38' provides an air gap between members 34 and 34' in FIG. 3A comprising communicating air gap regions 41, 42 and 44.

Rotation of member 34 180 degrees with respect to member 34' in FIG. 3B, changes the configuration of the air gap into communicating air gap regions 41, 46 and 46' which in turn changes and provides selective control over the reluctance of the magnetic coupling field.

Stator members 16 and 16' are respectively made from a magnetic material as is well known to those skilled in the art of stator design. It has been discovered that a ferromagnetic ceramic material having a permeability of about 2500 is particularly advantageous for use in making stators 16 and 16' of which one or both are comprised of members 34 and 34' hereinbefore described under the present invention.

The present invention then in a broader sense provides a means for controlling a magnetic field coupling circuit between relative stationary and rotary members by dividing the stator member into a pair of stator members of which at least one is selectively rotatable relative to the other to vary the reluctance of the magnetic field by varying the configuration of an air gap between the stator members and in a more limited sense wherein the rotary member and stator members are employed to provide an improved rotary transducer for controlling either or both the excitation and output voltages or signals of one or more sensor members and/or related electrical circuitry mounted to the rotatable member.

The present invention further includes embodiments of the improved rotary transducer of the invention wherein the sensor member is part of a wheatstone bridge located other than on the rotary member.

While the invention has been disclosed with respect to particular examples, it will be apparent that many modifications are possible and it is not intended to limit the invention except as defined in the following claims.

What is claimed is:

1. A magnetic field coupling circuit between relatively fixed and rotary members, said fixed member comprising a pair of adjacently positioned magnetic stator members secured in coaxial relation to the rotary member by means enabling at least one of the stator members to be selectively rotated relative to the other stator member, said stator members having a portion thereof in electrical contacting relationship with each other and a portion of respective facing surfaces thereof spaced axially apart from each other to provide an air gap therebetween having a configuration providing an electro-magnetic field having a reluctance characteristic thereof, a rotor member secured to the rotary member and operative to rotate in unison therewith within the air gap between the stator members, and said stator members having a portion of their respective facing surfaces provided with an asymmetrical configuration adapted such that selective rotation of one of said stator members with respect to the other alters the configuration of the air gap therebetween and thereby alters the reluctance of the magnetic field to provide control of said magnetic coupling circuit.

2. The coupling circuit of claim 1 wherein said stator members respective asymmetrical configuration is provided by said facing surfaces, having a portion thereof that taper radially outwardly away from each other.

3. A rotary transducer including at least one of the magnetic field coupling circuits of claim 1.

4. The circuit of claim 1 including a speed sensor for sensing the rotational speed of the rotary member.

5. An improved rotary transducer of the type comprising a housing, a rotary member rotatably mounted on the housing and having a sensing section thereof adapted to enhance sensing of stresses imposed on the rotary member by means of at least one strain gage member secured thereto, at least one magnetic stator member secured to the housing coaxially about the rotary member, and at least one rotor member secured to the rotary member and operative to rotate in unison therewith adjacent the stator member to provide a magnetic field coupling circuit therebetween, wherein said improvement is characterized by said stator member comprising a pair of adjacently positioned magnetic stator members secured in coaxial relation to the rotary member by means enabling at least one of the stator members to be selectively rotated relative to the other stator member, said stator members having a portion thereof in electrical contacting relationship with each other and having respective facing surfaces thereof spaced axially apart from each other to provide an air gap therebetween within which the rotor member rotates having a configuration providing an electro-magnetic field having a reluctance characteristic thereof, and said stator members having a portion of their respective facing surfaces provided with an asymmetrical configuration adapted such that selective rotation of one of said stator members relative to the other alters the configuration of the air gap and thereby alters the reluctance of the magnetic field to provide control over the magnetic coupling circuit between said rotor member and said stator members.

6. The transducer of claim 5 wherein said stator members respective asymmetrical configuration is provided by each of said facing surfaces having a portion thereof that taper radially outwardly away from each other.

7. The transducer of claim 5 including a speed sensor for sensing rotational speed of the rotary member.

* * * * *